(12) United States Patent
Cho et al.

(10) Patent No.: US 11,361,746 B2
(45) Date of Patent: Jun. 14, 2022

(54) AUDIO PLAYBACK APPARATUS AND METHOD HAVING NOISE-CANCELING MECHANISM

(71) Applicant: REALTEK SEMICONDUCTOR CORPORATION, Hsinchu (TW)

(72) Inventors: Chun-Ming Cho, Hsinchu (TW); Wei-Hung He, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/117,172

(22) Filed: Dec. 10, 2020

(65) Prior Publication Data

US 2021/0183355 A1 Jun. 17, 2021

(30) Foreign Application Priority Data

Dec. 13, 2019 (TW) .................................. 108145633

(51) Int. Cl.
*G10K 11/178* (2006.01)
*G06F 3/16* (2006.01)
(Continued)

(52) U.S. Cl.
CPC ........ *G10K 11/17854* (2018.01); *G06F 3/165* (2013.01); *G10K 11/17881* (2018.01);
(Continued)

(58) Field of Classification Search
CPC ....... G10K 11/17854; G10K 11/17881; G10K 2201/3026; G10K 2210/3027;
(Continued)

(56) References Cited

U.S. PATENT DOCUMENTS 9,437,182 B2 9/2016 Doclo
9,741,332 B2 8/2017 Asada
(Continued)

FOREIGN PATENT DOCUMENTS

| CN | 101989423 A | 3/2011 |
|---|---|---|
| CN | 104378774 A | 2/2015 |
| CN | 105575397 A | 5/2016 |

OTHER PUBLICATIONS

Sen M. Kuo et al., "Active Noise Control A Tutorial Review", Jun. 1999, pp. 943-973, vol. 87, No. 6, Proceedings of the IEEE.
(Continued)

*Primary Examiner* — Vivian C Chin
*Assistant Examiner* — Douglas J Suthers
(74) *Attorney, Agent, or Firm* — WPAT, PC

(57) ABSTRACT

The present disclosure discloses an audio playback apparatus having noise-canceling mechanism that includes a sound receiving circuit, a storage circuit, a filter control circuit, a filter circuit and an audio playback circuit. The sound receiving circuit receives received audio signal including noise. The storage circuit stores filter parameters. The filter control circuit includes a noise estimation circuit, a noise distribution determination circuit and a parameter generation circuit. The noise estimation circuit receives the received audio signal and calculates a stationary noise power spectrum density of the noise such that the noise distribution determination circuit determines a noise spectrum distribution accordingly. The parameter generation circuit analyses the noise spectrum distribution and retrieves a group of selected filter parameters accordingly. The filter circuit filters the received sound signal according to the group of selected filter parameters to generate an anti-noise audio signal. The audio playback circuit playbacks an actual audio signal and the anti-noise audio signal simultaneously.

14 Claims, 3 Drawing Sheets

(51) Int. Cl.
*G10L 25/18* (2013.01)
*G10L 25/21* (2013.01)
*H04R 1/02* (2006.01)

(52) U.S. Cl.
CPC .............. *G10L 25/18* (2013.01); *G10L 25/21* (2013.01); *H04R 1/025* (2013.01); *G10K 2210/3026* (2013.01); *G10K 2210/3027* (2013.01); *G10K 2210/3028* (2013.01); *G10K 2210/3044* (2013.01)

(58) Field of Classification Search
CPC .... G10K 2210/3028; G10K 2210/3044; G06F 3/165; G10L 25/18; G10L 25/21; H04R 1/025
USPC ......................................................... 381/71.1
See application file for complete search history.

(56) References Cited

U.S. PATENT DOCUMENTS

| | | | |
|---|---|---|---|
| 2011/0026724 A1* | 2/2011 | Doclo | G10K 11/17854 381/71.8 |
| 2020/0075038 A1* | 3/2020 | Sung | H04M 3/2236 |
| 2021/0233557 A1* | 7/2021 | Song | G10L 21/0216 |

OTHER PUBLICATIONS

Miss. Anuja Chougule et al., "Survey of Noise Estimation Algorithms for Speech Enhancement Using Spectral Subtraction", Dec. 2014, pp. 4156-4160, vol. 2 Issue: 12, International Journal on Recent and Innovation Trends in Computing and Communication.
OA letter of the counterpart TW application (appl. No. 108145633) dated Nov. 18, 2020. Summary of the OA letter: Claims 1~10 are rejected as being unpatentable over the disclosure of (CN 104378774A) and (CN 105575397A).

* cited by examiner

AUDIO PLAYBACK APPARATUS AND METHOD HAVING NOISE-CANCELING MECHANISM

BACKGROUND OF THE INVENTION

1. Field of the Invention

The present disclosure relates to an audio playback apparatus and an audio playback method having noise-canceling mechanism.

2. Description of Related Art

In order to provide users a better music listening experience, lots of earphones are equipped with noise-cancelling mechanism to avoid the interference from environmental noises. In recent years, the earphones are equipped with an active noise-canceling mechanism such that a noise is received by using a microphone and an anti-noise signal having an inverted phase is delivered according to a filtering result of the noise based on filtering coefficients to cancel the effect of the noise.

However, the earphones are portable products. Different types of environmental noises are generated according to different environments that the users using the earphones stay. The noises received from the environments in an airplane, on a street or inside a room are very different from each other. An anti-noise circuit configuration that uses fixed filtering coefficients cannot be applied to every usage scenario. An adaptive circuit configuration that dynamically adjusts the filtering coefficients is only used to keep a volume of an audio received by the microphone as small as possible. Different locations that the microphone locates result in different noises having larger differences therebetween. The characteristic of different types of noises cannot be reflected.

SUMMARY OF THE INVENTION

In consideration of the problem of the prior art, an object of the present disclosure is to provide an audio playback apparatus and an audio playback method having noise-canceling mechanism.

The present disclosure discloses an audio playback apparatus having noise-canceling mechanism that includes a sound receiving circuit, a storage circuit, a filter control circuit, a filter circuit and an audio playback circuit. The sound receiving circuit is configured to receive a received audio signal that includes noise. The storage circuit is configured to store a plurality of groups of filter parameters. The filter control circuit includes a noise estimation circuit, a noise distribution determination circuit and a parameter generation circuit. The noise estimation circuit is configured to receive the received audio signal and calculate a stationary noise power spectrum density of the noise. The noise distribution determination circuit configured to determine a noise spectrum distribution according to the stationary noise power spectrum density. The parameter generation circuit is configured to analyze the noise spectrum distribution and retrieve a group of selected filter parameters accordingly. The filter circuit is configured to filter the received sound signal according to the group of selected filter parameters to generate an anti-noise audio signal. The audio playback circuit is configured to playback an actual audio signal and the anti-noise audio signal simultaneously.

The present disclosure also discloses an audio playback method having noise-canceling mechanism that includes the steps outlined below. A received audio signal that includes noise is received by a sound receiving circuit. The received audio signal is received and a stationary noise power spectrum density of the noise is calculated by a noise estimation circuit of a filter control circuit. A noise spectrum distribution is determined according to the stationary noise power spectrum density by a noise distribution determination circuit of the filter control circuit. The noise spectrum distribution is analyzed and a group of selected filter parameters are retrieved accordingly from a plurality of groups of filter parameters stored in a storage circuit by a parameter generation circuit of the filter control circuit. The received sound signal is filtered according to the group of selected filter parameters to generate an anti-noise audio signal by a filter circuit. An actual audio signal and the anti-noise audio signal are playback simultaneously by an audio playback circuit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an audio playback apparatus and an audio playback method having noise-canceling mechanism to determine a group of selected filter parameters based on the characteristic of the noise spectrum distribution to cancel the noise. Not only the characteristic of noise can be reflected, but also the operation complexity can be reduced.

Figure 1:
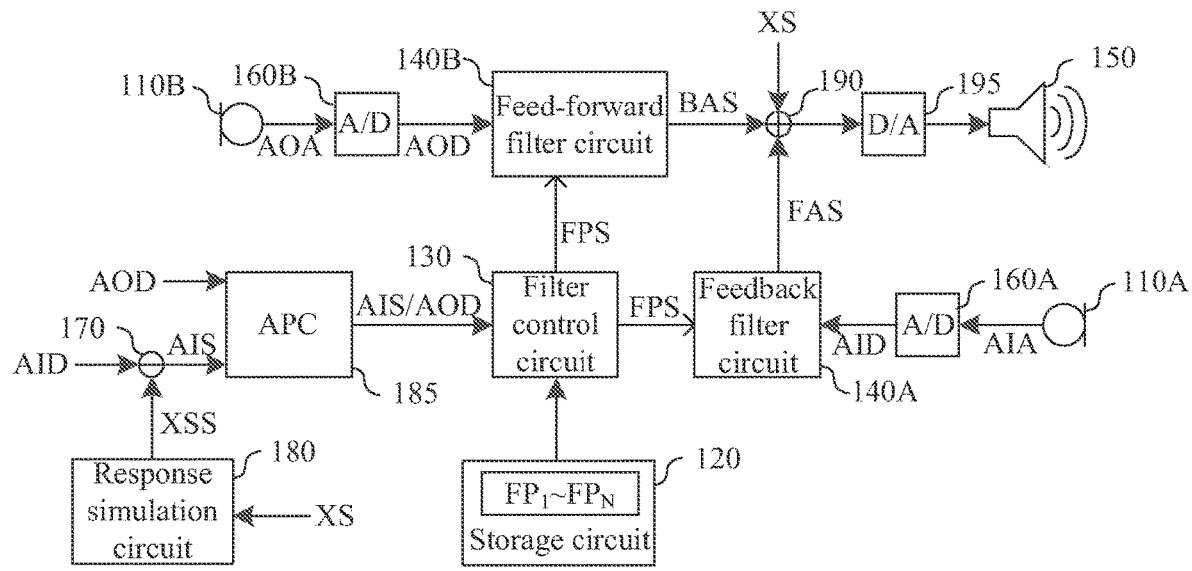
FIG. 1 illustrates a block diagram of an audio playback apparatus having noise-canceling mechanism according to an embodiment of the present invention.

Reference is now made to FIG. 1. FIG. 1 illustrates a block diagram of an audio playback apparatus 100 having noise-canceling mechanism according to an embodiment of the present invention. The audio playback apparatus 100 includes a sound receiving circuit that includes an internal sound receiving circuit 110A and an external sound receiving circuit 110B, a storage circuit 120, a filter control circuit 130, a filter circuit that includes a feedback filter circuit 140A and a feed-forward filter circuit 140B and an audio playback circuit 150.

In an embodiment, the audio playback apparatus 100 can be such as, but not limited to an earphone and includes a housing (not illustrated). In an embodiment, the storage circuit 120, the filter control circuit 130, the filter circuit and the audio playback circuit 150 are located inside of the housing. For the sound receiving circuit, the internal sound receiving circuit 110A is disposed inside of the housing, and the external sound receiving circuit 110B is disposed outside of the housing. In an embodiment, the audio playback circuit 150 is a speaker. Each of the internal sound receiving circuit 110A and the external sound receiving circuit 110B is a microphone.

The sound receiving circuit is configured to receive a received audio signal that includes noise. More specifically, in the present embodiment, the internal sound receiving circuit 110A included in the sound receiving circuit is disposed inside of the housing and is configured to receive an internal received audio signal AIA that includes internal noise. On the other hand, the external sound receiving circuit 110B is disposed outside of the housing and is configured to receive an external received audio signal AOA that includes external noise.

In an embodiment, the audio playback apparatus 100 may further include an analog to digital converter 160A (labeled as A/D in FIG. 1) and a subtracting circuit 170. The analog to digital converter 160A is configured to receive the internal received audio signal AIA in an analog form from the internal sound receiving circuit 110A to perform an analog to digital conversion to generate an internal received audio signal AID in a digital form. Since an actual audio signal XS (includes such as music or human voice) playback by the audio playback circuit 150 disposed inside of the housing is also received by the internal sound receiving circuit 110A, the subtracting circuit 170 is configured to subtract a component corresponding to the actual audio signal XS from the internal received audio signal AID to generate an actual internal received audio signal AIS.

In an embodiment, in order to simulate a frequency response of a path from the playback of the audio playback circuit 150 to the receipt of the of internal sound receiving circuit 110A, the audio playback apparatus 100 may further include a response simulation circuit 180 to filter the actual audio signal XS by using the frequency response of the path to generate a simulated actual audio signal XSS. The subtracting circuit 170 actually subtract the simulated actual audio signal XSS from the internal received audio signal AID to generate the actual internal received audio signal AIS.

In an embodiment, the audio playback apparatus 100 may further include an analog to digital converter 160B (labeled as A/D in FIG. 1) configured to receive the external received audio signal AOA in an analog form from the external sound receiving circuit 110B to perform an analog to digital conversion to generate an external received audio signal AOD in a digital form. Since the external sound receiving circuit 110B does not receive the actual audio signal XS playback by the audio playback circuit 150, no subtraction is required to be performed on the external received audio signal AOD.

The storage circuit 120 is configured to store a plurality of groups of filter parameters $FP_1 \sim FP_N$. Each of the groups of the filter parameters $FP_1 \sim FP_N$ has a unique characteristic on the frequency domain. For example, a part of the groups of the filter parameters $FP_1 \sim FP_N$ are designed to attenuate the noise in a high frequency range, another part of the groups of the filter parameters $FP_1 \sim FP_N$ are designed to attenuate the noise in a low frequency, and yet another part of the groups of the filter parameters $FP_1 \sim FP_N$ are designed to attenuate the noise in specific frequency points in both high frequency range and low frequency range.

Figure 2:
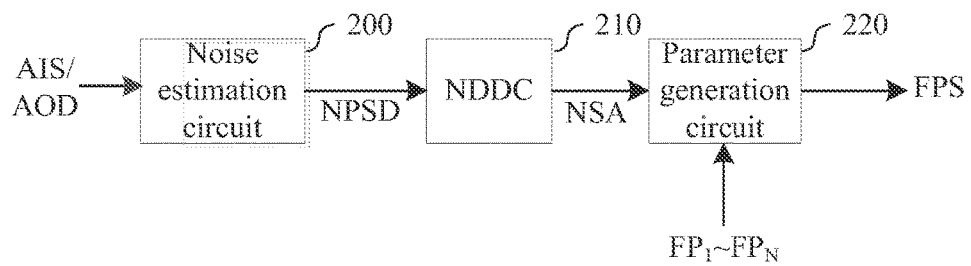
FIG. 2 illustrates a detailed block diagram of the filter control circuit according to an embodiment of the present invention.

Reference is now made to FIG. 2. FIG. 2 is a detailed block diagram of the filter control circuit 130 according to an embodiment of the present invention. The filter control circuit 130 includes a noise estimation circuit 200, a noise distribution determination circuit 210 (labeled as NDDC in FIG. 2) and a parameter generation circuit 220.

The noise estimation circuit 200 is configured to receive the received audio signal and calculate a stationary noise power spectrum density NPSD of the noise.

In an embodiment, the received audio signal received by the noise estimation circuit 200 actually includes the actual internal received audio signal AIS and/or the external received audio signal AOD. Further, the received audio signal can be received by the noise estimation circuit 200 through the transmission and the conversion from a time domain and a frequency domain of an audio preprocessing circuit 185 (labeled as APC in FIG. 1). The noise estimation circuit 200 further calculates the stationary noise power spectrum density NPSD of the noise included in the actual internal received audio signal AIS and/or the external received audio signal AOD. The noise may include the internal noise included in the actual internal received audio signal AIS and/or the external noise included in the external received audio signal AOD.

Figure 3:
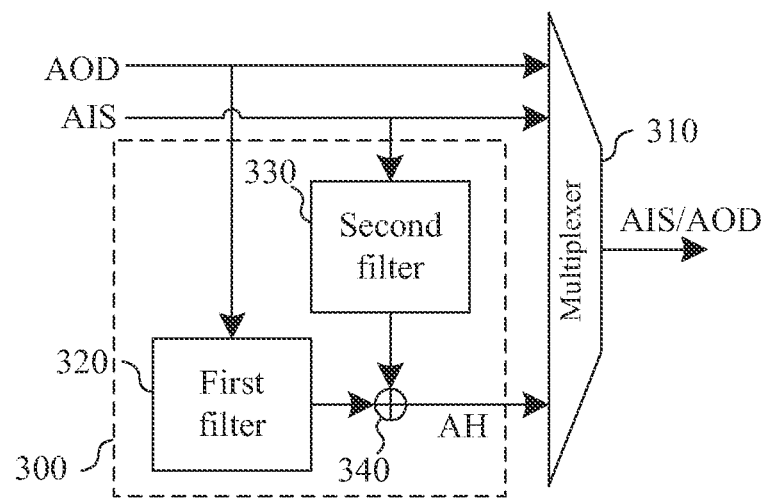
FIG. 3 illustrates a detailed block diagram of the audio preprocessing circuit according to an embodiment of the present invention.

Reference is now made to FIG. 3. FIG. 3 is a detailed block diagram of the audio preprocessing circuit 185 according to an embodiment of the present invention. The audio preprocessing circuit 185 includes a mixer circuit 300 and a multiplexer 310.

In an embodiment, the mixer circuit 300 includes a first filter 320, a second filter 320 and a mixer 340. The first filter 320 is configured to filter the external received audio signal AOD. The second filter 330 is configured to filter the actual internal received audio signal AIS. The mixer 340 is configured to add the filtering results of the first filter 320 and the second filter 320 to generate a mixed audio signal AH.

For example, in a usage scenario, the external noise included in the external received audio signal AOD has stronger high frequency components. The internal noise included in the actual internal received audio signal AIS has stronger low frequency components. As a result, the first filter 320 and the second filter 330 can be a high pass filter and a low pass filter respectively to retrieve the high frequency component of the external received audio signal AOD and the low frequency component of the actual internal received audio signal AIS to be added by the mixer 340 as the mixed audio signal AH. In another embodiment, the first filter 320 and the second filter 330 respectively multiply the high frequency signal and the low frequency signal by different weightings to perform a scaling conversion. The high frequency component of the external received audio signal AOD and the low frequency component of the actual internal received audio signal AIS can be weighted, and subsequently retrieved and mixed by the mixer 340 to generate the mixed audio signal AH. It is appreciated that the filtering characteristic of the first filter 320 and the second filter 330 and the setting of the weightings can be adjusted according to practical requirements. The present invention is not limited thereto.

The multiplexer 310 is configured to receive the actual internal received audio signal AIS and the external received audio signal AOD to either select one of them to be outputted or output the mixed audio signal AH simultaneously having a part of the actual internal received audio signal AIS and a part of the external received audio signal AOD. In the diagram, the symbol "AIS/AOD" is used to represent the condition that at least one of the actual internal received audio signal AIS and the external received audio signal AOD can be outputted. In another embodiment, the multiplexer 310 outputs the final result in the form of the mixed audio signal AH.

After receiving the actual internal received audio signal AIS and/or the external received audio signal AOD, the noise estimation circuit 200 calculates the stationary noise power spectrum density NPSD of the noise. In different embodiments, the noise estimation circuit 200 uses such as, but not limited to a spectral subtraction method of the speech enhancement technology and various noise estimation methods to accomplish the object of the calculation of the stationary noise power spectrum density NPSD. In an embodiment, the non-stationary component of the actual internal received audio signal AIS and/or the external received audio signal AOD is treated as a speech while the stationary component thereof is treated as the noise.

The noise distribution determination circuit 210 is configured to determine a noise spectrum distribution NSA according to the stationary noise power spectrum density NPSD. In an embodiment, the noise spectrum distribution NSA includes the energy amount of noises at different frequency spots.

The parameter generation circuit 220 is configured to analyze the noise spectrum distribution NSA and retrieve a group of selected filter parameters FPS accordingly from the groups of the filter parameters $FP_1$~$FP_N$ stored in the storage circuit 120.

In an embodiment, the parameter generation circuit 220 is configured to determine P frequency points having the largest energy in the noise spectrum distribution NSA to calculate a total energy decreasing amount of the P frequency points corresponding to each of the groups of filter parameters and select one of the groups of filter parameters corresponding to the largest total energy decreasing amount to be the group of selected filter parameters FPS. In the present embodiment, P is a positive integer.

Figure 4:
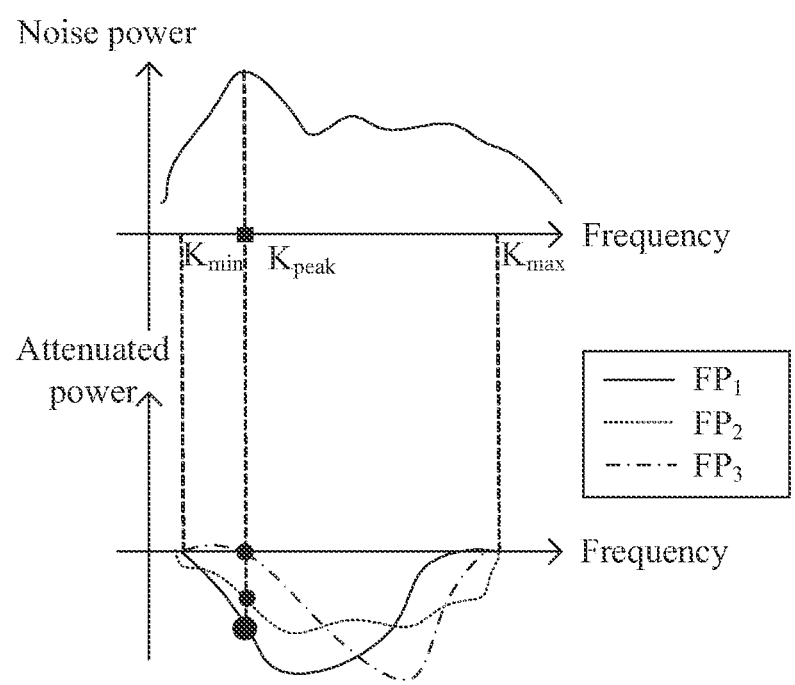
FIG. 4 illustrates a diagram of waveforms of the energy of the noise spectrum distribution and the amount of energy that the groups of the filter parameters can attenuate according to an embodiment of the present invention.

Reference is now made to FIG. 4 at the same time. FIG. 4 is a diagram of waveforms of the energy of the noise spectrum distribution NSA and the amount of energy that the groups of the filter parameters $FP_1$~$FP_3$ can attenuate according to an embodiment of the present invention.

The upper half of FIG. 4 illustrates the waveform of the energy of the noise spectrum distribution NSA, in which the X-axis corresponds to the frequency and the Y-axis corresponds to the noise power having positive values. The lower half of FIG. 4 illustrates waveforms of the amount of energy that the groups of the filter parameters $FP_1$~$FP_3$ can attenuate, in which the X-axis corresponds to the frequency and the Y-axis corresponds to the attenuated amount of power. Since the groups of the filter parameters $FP_1$~$FP_3$ are used to attenuate the energy of the noise, the values of the attenuated amount of power of the waveforms are negative.

Take the condition that the number P is 1 as an example, the parameter generation circuit 220 is configured to determine the frequency point having the largest energy in the noise spectrum distribution NSA. Take the noise spectrum distribution NSA in FIG. 4 as an example, the parameter generation circuit 220 set a frequency range for searching in advance from a boundary frequency point $K_{min}$ to another boundary frequency point $K_{max}$, e.g. from 50 Hz to 4000 Hz that greatly affects human ears, and search the frequency point $K_{peak}$ having the largest energy.

As illustrated in FIG. 4, the number of the groups of the filter parameters $FP_1$~$FP_3$ is 3. However, the present invention is not limited thereto. The parameter generation circuit 220 calculates the total energy decreasing amount of the frequency point $K_{peak}$ for each of the groups of the filter parameters $FP_1$~$FP_3$.

In practical implementation, corresponding to the frequency point $K_{peak}$ having the largest energy and corresponding to the m-th filter parameters, the parameter generation circuit 220 calculates a decreased energy ratio NRm[$K_{peak}$] between the energy value PD after the noise is decreased according to the parameters and the energy value PO before the noise decreased and expresses the decreased energy ratio NRm[$K_{peak}$] as PD/PO. Alternatively, the parameter generation circuit 220 can express the ratio in a decibel form of NRDBm[$K_{peak}$]=10×$\log_{10}$NRm[$K_{peak}$]. When the ratio NRm[$K_{peak}$] or the decibel form NRDBm[$K_{peak}$] is smaller, the total energy decreasing amount of such group of filter parameters is larger and is more possible to be selected as the group of the selected filter parameters FPS.

Take the three groups of filter parameters $FP_1$~$FP_3$ illustrated in FIG. 4 as an example, the waveform of the group of filter parameters $FP_1$ shows that the amount of energy that is able to be decreased corresponding to the frequency point $K_{peak}$ is the largest. As a result, the parameter generation circuit 220 selects the group of filter parameters $FP_1$ to be outputted.

In other embodiments, when P is an integer larger than 1, the parameter generation circuit 220 calculates a total energy decreasing amount of the P frequency points corresponding to each of the groups of filter parameters $FP_1$~$FP_N$. The total energy decreasing amount can be a multiplication result of all the decreased energy ratios of all the frequency points or can be an added result of all the decreased energy ratios expressed in the decibel form. The parameter generation circuit 220 determines the largest total energy decreasing amount based on the calculation results and outputs the group of selected filter parameters FPS accordingly.

In another embodiment, the parameter generation circuit 220 is configured to calculate a noise to power ratio of each of the groups of filter parameters $FP_1$~$FP_N$.

Any one of the groups of filter parameters $FP_1$~$FP_N$ have a plurality of focused frequency points coef.m (e.g. the frequency points having the best noise-decreasing performance) on the noise spectrum distribution NSA. As a result, the total focused noise power amount of these focused frequency points on the noise spectrum distribution NSA can be expressed by the following equation:

$$\Sigma_{k \in coef.m}[N[k]]^2 \qquad \text{(equation 1)}$$

In all the noise spectrum distribution NSA, the total noise power amount from the boundary frequency point $K_{min}$ to the boundary frequency point $K_{max}$ can be expressed as:

$$\sum_{k_{min} \le k \le k_{max}} [N[k]]^2 \qquad \text{(equation 2)}$$

As a result, when the noise to power ratio is R, the noise to power ratio R can be expressed as the ratio between the total focused noise power amount in equation 1 and the total noise power amount in equation 2:

$$R = \sum_{k \in coef.m} [N[k]]^2 \Big/ \sum_{k_{min} \le k \le k_{max}} [N[k]]^2 \qquad \text{(equation 3)}$$

As a result, the parameter generation circuit 220 further selects one of the groups of filter parameters $FP_1$~$FP_N$ having the noise to power ratio larger than a predetermined value to be the group of selected filter parameters FPS. When none of the groups of filter parameters $FP_1$~$FP_N$ has the noise to power ratio larger than the predetermined value, a default group of filter parameters can be selected as the group of selected filter parameters FPS.

The feedback filter circuit 140A and the feed-forward filter circuit 140B included in the filter circuit are configured to filter the noise according to the group of selected filter parameters FPS to generate an anti-noise audio signal.

In the present embodiment, the feedback filter circuit 140A and the feed-forward filter circuit 140B respectively filter the internal received audio signal AID and the external received audio signal AOD according to the group of selected filter parameters FPS to generate a feedback anti-noise audio signal FAS and a feed-forward anti-noise audio signal BAS.

The audio playback circuit 150 is configured to playback the actual audio signal XS and the anti-noise audio signal including the feedback anti-noise audio signal FAS and the feed-forward anti-noise audio signal BAS simultaneously.

In an embodiment, the audio playback apparatus 100 further includes an adder circuit 190 and a digital to analog conversion circuit 195 (labeled as D/A in FIG. 1). The adder circuit 190 is configured to add the actual audio signal XS, the feedback anti-noise audio signal FAS and the feed-forward anti-noise audio signal BAS such that the digital to analog conversion circuit 195 performs digital to analog conversion on the added result and transmits the converted result to the audio playback circuit 150 to be playback.

As a result, the audio playback apparatus 100 can determine the noise spectrum distribution according to the stationary noise power spectrum density obtained from the received audio signal to further retrieve the group of selected filter parameters based on the characteristic analyzed from the noise spectrum distribution. The anti-noise signal can be generated according to the group of selected filter parameters without a complex calculation mechanism to dynamically adjust the filter parameters in real time. On one aspect, the noise characteristic can be reflected. On the other aspect, a different group of selected filter parameters can be used after a longer time in a different environment. The unnatural listening experience caused by a frequent switching of different filter parameters can be avoided.

It is appreciated that a configuration having both the feed-forward mechanism and the feedback mechanism are illustrated in the audio playback apparatus 100 in FIG. 1. In other embodiments, the audio playback apparatus 100 can selectively include only the external sound receiving circuit 110B and the feed-forward filter circuit 140B corresponding to the feed-forward mechanism or only the internal sound receiving circuit 110A and the feedback filter circuit 140A corresponding to the feedback mechanism to use only one of the feed-forward mechanism and the feedback mechanism to accomplish the object of noise-cancelling.

Figure 5:
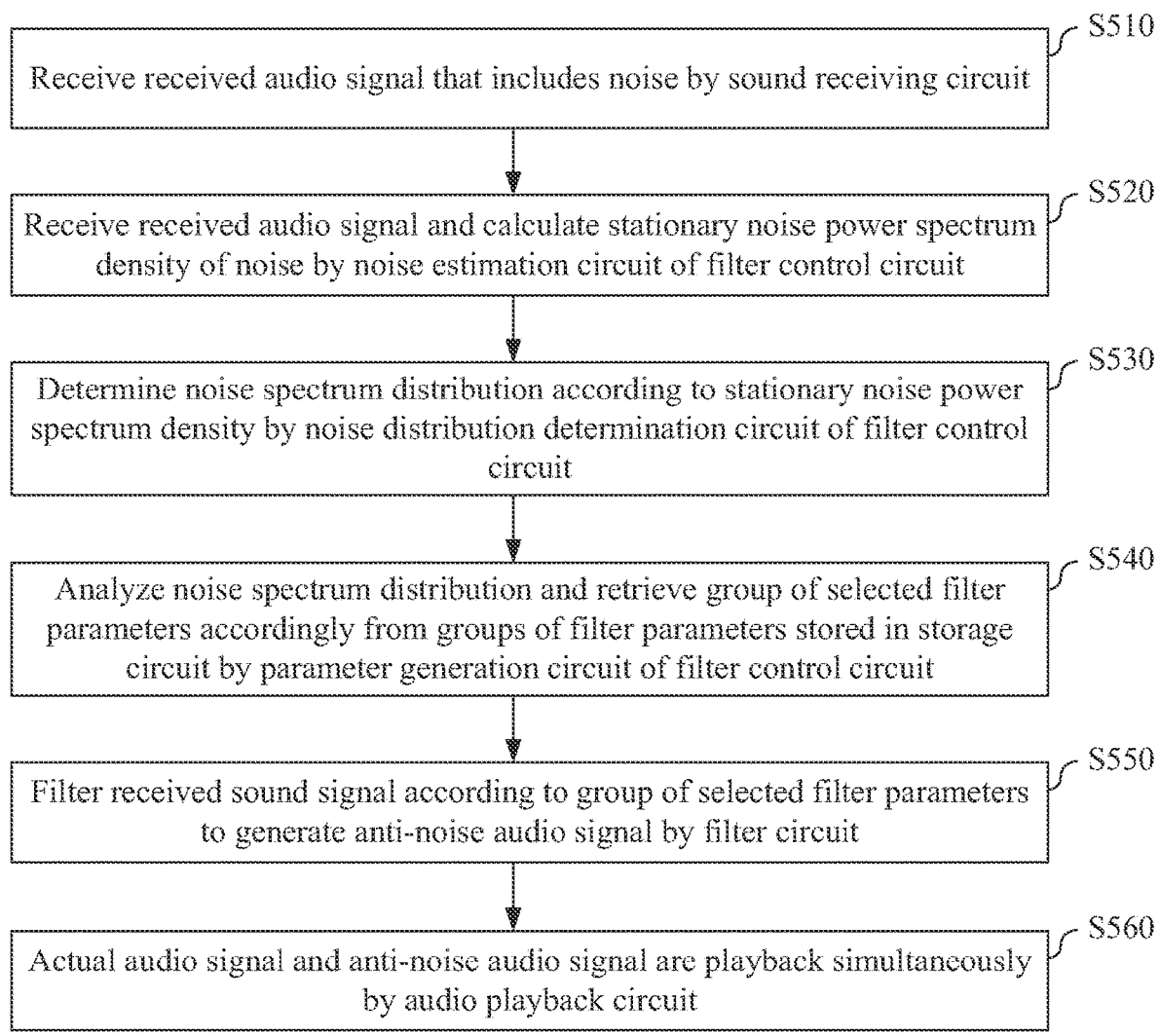
FIG. 5 illustrates a flow chart of an audio playback method having noise-canceling mechanism according to an embodiment of the present invention.

Reference is now made to FIG. 5. FIG. 5 is a flow chart of an audio playback method 500 according to an embodiment of the present invention.

Besides the device described above, the present invention further provides the audio playback method 500 that can be used in such as, but not limited to the audio playback apparatus 100 in FIG. 1. As illustrated in FIG. 5, an embodiment of the audio playback method 500 includes the following steps.

In step S510, the received audio signal that includes the noise is received by the sound receiving circuit.

In an embodiment, the sound receiving circuit includes an internal sound receiving circuit 110A and/or an external sound receiving circuit 110B to receive an internal received audio signal AIA and an external received audio signal AOA included in the received audio signal.

In step S520, the received audio signal is received and a stationary noise power spectrum density of the noise is calculated by the noise estimation circuit 200 of the filter control circuit 130.

In an embodiment, an analog to digital conversion can be performed on the internal received audio signal AIA and the component of the actual audio signal XS can be subtracted from the internal received audio signal AIA to generate the actual internal received audio signal AIS. An analog to digital conversion can be performed on the external received audio signal AOA to generate the actual external received audio signal AOD. After the process of the audio preprocessing circuit 185, the actual internal received audio signal AIS and/or the actual external received audio signal AOD can be received by the noise estimation circuit 200 to calculate the stationary noise power spectrum density of the noise NPSD of the noise.

In step S530, the noise spectrum distribution NSA is determined according to the stationary noise power spectrum density NPSD by the noise distribution determination circuit 210 of the filter control circuit 130.

In step S540, the noise spectrum distribution NSA is analyzed and the group of selected filter parameters FPS are retrieved accordingly from the groups of filter parameters $FP_1$~$FP_N$ stored in the storage circuit 120 by the parameter generation circuit 220 of the filter control circuit 130.

In an embodiment, the parameter generation circuit 220 can select one of the groups of filter parameters $FP_1$~$FP_N$ that has the best attenuating effect on the noise spectrum distribution NSA to be the group of selected filter parameters FPS. In another embodiment, the parameter generation circuit 220 determines one of the groups of filter parameters $FP_1$~$FP_N$ corresponding to the focused frequency points that have the largest noise components on the noise spectrum distribution NSA to be the group of selected filter parameters FPS.

In step S550, the received sound signal is filtered according to the group of selected filter parameters FPS to generate the anti-noise audio signal by the filter circuit.

In an embodiment, the filter circuit includes a feedback filter circuit 140A and/or a feed-forward filter circuit 140B respectively configured to filter the internal received audio signal AID and the external received audio signal AOD according to the group of selected filter parameters FPS to generate the feedback anti-noise audio signal FAS and the feed-forward anti-noise audio signal BAS included in the anti-noise audio signal.

In step S560, the actual audio signal XS and the anti-noise audio signal are playback simultaneously by the audio playback circuit 150.

It is appreciated that the embodiments described above are merely an example. In other embodiments, it should be appreciated that many modifications and changes may be made by those of ordinary skill in the art without departing from the spirit of the invention.

In summary, the audio playback apparatus and the audio playback method having noise-canceling mechanism can determine a group of selected filter parameters according to the characteristic of the noise spectrum distribution to accomplish the noise-canceling mechanism. Not only the noise characteristic can be reflected, but also the operation complexity can be decreased.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An audio playback apparatus having noise-canceling mechanism, comprising:
   a sound receiving circuit configured to receive a received audio signal that comprises noise;
   a storage circuit configured to store a plurality of groups of filter parameters;
   a filter control circuit comprising:
      a noise estimation circuit configured to receive the received audio signal and calculate a stationary noise power spectrum density of the noise;
      a noise distribution determination circuit configured to determine a noise spectrum distribution according to the stationary noise power spectrum density; and
      a parameter generation circuit configured to analyze the noise spectrum distribution and retrieve a selected group of filter parameters from the plurality of groups of filter parameters accordingly;
   a filter circuit configured to filter the received sound signal according to the group of selected filter parameters to generate an anti-noise audio signal; and
   an audio playback circuit configured to playback an actual audio signal and the anti-noise audio signal simultaneously.

2. The audio playback apparatus of claim 1, wherein the audio playback apparatus is disposed inside of a housing, and the sound receiving circuit comprises an external sound receiving circuit and/or an internal sound receiving circuit, in which the external sound receiving circuit is disposed outside of the housing and is configured to receive an external received audio signal that comprises external noise, and the internal sound receiving circuit is disposed inside of the housing and is configured to receive an internal received audio signal that comprises internal noise.

3. The audio playback apparatus of claim 2, further comprising a subtracting circuit configured to subtract a component corresponding to the actual audio signal from the internal received audio signal to generate an actual internal received audio signal such that the noise estimation circuit retrieves the noise according to the actual internal received audio signal.

4. The audio playback apparatus of claim 3, further comprising an audio preprocessing circuit configured to select one of the external received audio signal, the internal received audio signal ander a mixed received audio signal when the sound receiving circuit comprises the external sound receiving circuit and the internal sound receiving circuit at the same time, so as to be received by the noise estimation circuit, wherein the mixed received audio signal comprises both the external received audio signal and the internal received audio signal.

5. The audio playback apparatus of claim 3, wherein the filter circuit comprises a feed-forward filter circuit and/or a feedback filter circuit, wherein the feed-forward filter circuit is configured to filter the external received audio signal according to the group of selected filter parameters to generate a feed-forward anti-noise audio signal comprised in the anti-noise audio signal, and the feedback filter circuit is configured to filter the internal received audio signal according to the group of selected filter parameters to generate a feedback anti-noise audio signal comprised in the anti-noise audio signal.

6. The audio playback apparatus of claim 1, wherein the parameter generation circuit is configured to determine P frequency points having the largest energy in the noise spectrum distribution to calculate a total energy decreasing amount of the P frequency points corresponding to each of the groups of filter parameters, and select one of the groups of filter parameters corresponding to the largest total energy decreasing amount to be the selected group of filter parameters.

7. The audio playback apparatus of claim 1, wherein the parameter generation circuit is configured to calculate a noise to power ratio of each of the groups of filter parameters, wherein the noise to power ratio is a ratio between a total focused noise power amount and a total noise power amount in all the noise spectrum distribution, in which the total focused noise power amount corresponds to an amount of noise at a plurality of focused frequency points in the noise spectrum distribution;
   wherein the parameter generation circuit further selects one of the groups of filter parameters having the noise to power ratio larger than a predetermined value to be the selected group of filter parameters.

8. An audio playback method having noise-canceling mechanism, comprising:
   receiving a received audio signal that comprises noise by a sound receiving circuit;
   receiving the received audio signal and calculating a stationary noise power spectrum density of the noise by a noise estimation circuit of a filter control circuit;
   determining a noise spectrum distribution according to the stationary noise power spectrum density by a noise distribution determination circuit of the filter control circuit;
   analyzing the noise spectrum distribution and retrieving a selected group of filter parameters from a plurality of groups of filter parameters stored in a storage circuit by a parameter generation circuit of the filter control circuit;
   filtering the received sound signal according to the group of selected filter parameters to generate an anti-noise audio signal by a filter circuit; and
   playbacking an actual audio signal and the anti-noise audio signal simultaneously by an audio playback circuit.

9. The audio playback method of claim 8, wherein the sound receiving circuit comprises an external sound receiving circuit and/or an internal sound receiving circuit, in which the external sound receiving circuit is disposed outside of a housing and the internal sound receiving circuit is disposed inside of the housing, the audio playback method further comprises:
   receiving an external received audio signal that comprises external noise by the external sound receiving circuit; and
   receiving an internal received audio signal that comprises internal noise by the internal sound receiving circuit.

10. The audio playback method of claim 9, further comprising:
   subtracting a component corresponding to the actual audio signal from the internal received audio signal by a subtracting circuit to generate an actual internal received audio signal such that the noise estimation circuit retrieves the noise according to the actual internal received audio signal.

11. The audio playback method of claim 10, further comprising:
selecting one of the external received audio signal, the internal received audio signal ander a mixed received audio signal by an audio preprocessing circuit when the sound receiving circuit comprises the external sound receiving circuit and the internal sound receiving circuit at the same time, so as to be received by the noise estimation circuit, wherein the mixed received audio signal comprises both the external received audio signal and the internal received audio signal.

12. The audio playback method of claim 10, wherein the filter circuit comprises a feed-forward filter circuit and/or a feedback filter circuit, the audio playback method further comprises:
filtering the external received audio signal according to the group of selected filter parameters by the feed-forward filter circuit to generate a feed-forward anti-noise audio signal comprised in the anti-noise audio signal; and
filtering the internal received audio signal according to the group of selected filter parameters by the feedback filter circuit to generate a feedback anti-noise audio signal comprised in the anti-noise audio signal.

13. The audio playback method of claim 8, further comprising:
determining P frequency points having the largest energy in the noise spectrum distribution by the parameter generation circuit to calculate a total energy decreasing amount of the P frequency points corresponding to each of the groups of filter parameters; and
selecting one of the groups of filter parameters corresponding to the largest total energy decreasing amount to be the selected group of filter parameters by the parameter generation circuit.

14. The audio playback method of claim 8, further comprising:
calculating a noise to power ratio of each of the groups of filter parameters by the parameter generation circuit, wherein the noise to power ratio is a ratio between a total focused noise power amount and a total noise power amount in all the noise spectrum distribution, in which the total focused noise power amount corresponds to an amount of noise at a plurality of focused frequency points in the noise spectrum distribution; and
selecting one of the groups of filter parameters having the noise to power ratio larger than a predetermined value to be the selected group of selected filter parameters by the parameter generation circuit.

* * * * *